US009351226B2

(12) United States Patent
Lee et al.

(10) Patent No.: US 9,351,226 B2
(45) Date of Patent: May 24, 2016

(54) COMMUNICATION METHOD AND APPARATUS BASED ON ASSOCIATION MECHANISM IN WIRELESS LOCAL AREA NETWORK SYSTEM

(75) Inventors: Ji Hyun Lee, Anyang-si (KR); Eun Sun Kim, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 14/130,870

(22) PCT Filed: Feb. 24, 2012

(86) PCT No.: PCT/KR2012/001438
§ 371 (c)(1),
(2), (4) Date: Jan. 3, 2014

(87) PCT Pub. No.: WO2013/005908
PCT Pub. Date: Jan. 10, 2013

(65) Prior Publication Data
US 2014/0146805 A1    May 29, 2014

Related U.S. Application Data

(60) Provisional application No. 61/504,327, filed on Jul. 5, 2011, provisional application No. 61/506,169, filed on Jul. 11, 2011.

(51) Int. Cl.
*H04W 4/00*      (2009.01)
*H04W 40/02*     (2009.01)
*H04W 60/00*     (2009.01)
*H04W 84/12*     (2009.01)

(52) U.S. Cl.
CPC .............. *H04W 40/02* (2013.01); *H04W 60/00* (2013.01); *H04W 84/12* (2013.01)

(58) Field of Classification Search
USPC ......... 370/338, 331, 328, 329, 351, 464, 232, 370/252, 310, 312; 455/403, 422.1, 423, 455/67.11
See application file for complete search history.

(56) References Cited

U.S. PATENT DOCUMENTS 8,605,595 B2 * 12/2013 Kim et al. ...................... 370/236
2009/0141685 A1 * 6/2009 Berglund ....................... 370/331
2010/0177756 A1    7/2010 Choi et al.

FOREIGN PATENT DOCUMENTS

KR    10-2010-0084138    7/2010
KR    10-2010-0104158    9/2010

* cited by examiner

*Primary Examiner* — Chi H Pham
*Assistant Examiner* — Alexander O Boakye
(74) *Attorney, Agent, or Firm* — Lee Hong Degerman Kang & Waimey; Jonathan Kang; Jeffrey Lotspeich (57) ABSTRACT

A method of communicating between an access point (AP) and a station (STA) in a Wireless Local Area Network (WLAN) system is provided. The method includes receiving an association request (AREQ) frame requesting an association, from a STA, the AREQ frame comprising a common association response (C-ARSP) indicator indicating whether the STA has been received common association information for the association between the STA and the AP, determining an association response (ARSP) type for the STA based on the C-ARSP indicator and performing an association response for the ARSP type to the STA.

22 Claims, 9 Drawing Sheets

| Order | Information(length in octet) | Notes |
|---|---|---|
| 1 | Capability (2) | |
| 2 | Listen interval (2) | |
| 3 | SSID (2) | |
| 4 | Supported rates (3-10) | |
| 5 | Extended Supported Rates (3-257) | The Extended Supported Rates element is present if there are more than eight supported rates, and it is optional otherwise. |
| 6 | Power Capability (4-257) | The Power Capability element is present if dot11SpectrumManagementRequired is true or dot11RadioMeasurementActivated is true. |
| 7 | Supported Channels (4-256) | The Supported Channels element is present if dot11SpectrumManagement Required is true and dot11ExtendedChannelSwitchActivated is false. |
| 8 | RSN (36-256) | The RSN element is present if dot11RSNAActivated set to true. |
| 9 | QoS Capability (3) | The QoS Capability element is present if dot11QoSOption-Implemented is true. |
| 10 | RM Enabled Capabilities (7) | RM Enabled Capabilities element is present if dot11RadioMeasurementActivated is true. |
| 11 | Mobility domain | The MDE is present in an Association Reqeust frame if dot11FastBSStransitionActivated is true and if the frame is being sent to an AP that advertised its FT capability in the MDE in its Beacon or Probe Response frame(i.e., AP also has dot11FastBSSTransitionActivated set to true). |
| 12 | Supported Operating Classes (4-255) | The Supported Operating Classes element is present if dot11ExtededChannelSwitchActivated is true. |
| 13 | IIT Capabilities (28) | The IIT Capabilities element is present when dot11HighThroughputOptionImplemented attribute is true. |
| 14 | 20/40 BSS Coexistance (3) | The 20/40 BSS Coexistence element is optionally present when the dot112040BSSCoexistenceManagementSuprot attribute is true. |
| 15 | Extended Capabilities (3) | The Extended Capabilities element is optionally present if any of the fields in this element are nonzero. |
| Last | Vendor Specific (3-257) | One or more vendor-specific elements are optionally present. Theses elements follow all other elements. |

Fig. 3

| Order | Information | Notes |
|---|---|---|
| 1 | Capability | |
| 2 | Status code | |
| 3 | AID | |
| 4 | Supported rates | |
| 5 | Extended Supported Rates | The Extended Supported Rates element is present if there are more than eight supported rates, and it is optional otherwise. |
| 6 | EDCA Parameter Set | |
| 7 | RCPI | The RCPI element is present if dot11RMRCPIMeasurementActivated is true. |
| 8 | RSNI | The RSNI element is present if dot11RMRSNIMeasurementActivated is true. |
| 9 | RM Enabled Capabilities | RM Enabled Capabilities element is present if dot11RadioMeasurementActivated is true. |
| 10 | Mobility domain | An MDE is present in an Association Response frame when dot11FastBSSTransitionActivated is true and this frame is a response to an Association Request frame that contained an MED(i.e., an FT initial mobility domain association exchange). |
| 11 | Fast BSS transition | A Fast BSS Transition element is present in an Association Response frame when dot11FastBSSTransitionActivated is ture, dot11RSNAActivated is true and this frame is response to an AssociationRequest frame that contained an MDE(i.e., an FT initial mobility domain association exchange in an RSN). |
| 12 | DSE registered location | The DSE Registered Location element is present if dot11LCIDSERequired is true. |
| 13 | Timeout Interval(Association Comeback time) | A Timeout Interval element containg the Association Comeback time is present when dot11RSNAActivated is true, dot11RSNAProtectedManagementFramesAcivated is true and the association request is rejected with a status code 30. |
| 14 | HT Capabilities | The HT Capabilities element is present when dot11HighThroughputOptionImplemented attribute is true. |
| 15 | HT Operation | The HT Operation element is included by an AP when dot11HighThroughputOptionImplemented attribute is ture. |
| 16 | 20/40 BSS Coexistance | The 20/40 BSS Coexistence element is optionally present when the dot112040BSSCoexistenceManagementSupprot attribute is true. |
| 17 | Overlapping BSS Scan Parameters | The Overlapping BSS Scan Parameters element is optionally present if the dot11FortyMHzOptionImplemented attribute is true. |
| 18 | Extended Capabilities | The Extended Capabilities element is optionally present if any of the fields in this element are nonzero. |
| Last | Vendor Specific | One or more vendor-specific elements are optionally present. Theses elements follow all other elements. |

| Order | Information(length in octets) | Notes |
|---|---|---|
| 1 | Capability (2) | |
| 2 | Supported rates (3-10) | |
| 3 | EDCA Parameter Set (20) | |
| 4 | Extended Supported Rates (3-257) | The Extended Supported Rates element is present if there are more than eight supported rates, and it is optional otherwise. |
| 5 | RM Enabled Capabilities (7) | RM Enabled Capabilities element is present if dot11RadioMeasurementActivated is true. |
| 6 | DSE registered location (22) | The DSE Registered Location element is present if dot11LCIDSERequired is true. |
| 7 | HT Capabilities (28) | The HT Capabilities element is present when dot11HighThroughputOptionImplemented attribute is true. |
| 8 | HT Operation (24) | The HT Operation element is included by an AP when dot11HighThroughputOptionImplemented attribute is ture. |
| 9 | 20/40 BSS Coexistance (3) | The 20/40 BSS Coexistence element is optionally present when the dot112040BSSCoexistenceManagementSupprot attribute is true. |
| 10 | Overlapping BSS Scan Parameters (16) | The Overlapping BSS Scan Parameters element is optionally present if the dot11FortyMHzOptionImplemented attribute is true. |
| 11 | Extended Capabilities (3) | The Extended Capabilities element is optionally present if any of the fields in this element are nonzero. |
| Last | Vendor Specific (3 257) | One or more vendor-specific elements are optionally present. Theses elements follow all other elements. |

Fig. 6

| Order | Information(length in octets) | Notes |
|---|---|---|
| 1 | Status code (2) | |
| 2 | AID (2) | |
| 3 | RCPI (3) | The RCPI element is present if dot11RMRCPIMeasurementActivated is true. |
| 4 | RSNI (3) | The RSNI element is present if dot11RMRSNIMeasurementActivated is true. |
| 5 | Mobility domain (5) | An MDE is present in an Association Response frame when dot11FastBSSTransitionActivated is true and this frame is a response to an Association Request frame that contained an MED(i.e., an FT initial mobility domain association exchange). |
| 6 | Fast BSS transition (84-257) | A Fast BSS Transition element is present in an Association Response frame when dot11FastBSSTransitionActivated is ture, dot11RSNAActivated is true and this frame is response to an AssociationRequest frame that contained an MDE(i.e., an FT initial mobility domain association exchange in an RSN). |
| 7 | Timeout Interval(Associati on Comeback time) (7) | A Timeout Interval element containg the Association Comeback time is present when dot11RSNAActivated is true, dot11RSNAProtectedManagementFramesAcivated is true and the association request is rejected with a status code 30. |

| Order | Information(length in octets) | Notes |
|---|---|---|
| 1 | Capability (2) | |
| 2 | Supported rates (3-10) | |
| 3 | EDCA Parameter Set (20) | |
| 4 | Extended Supported Rates (3-257) | The Extended Supported Rates element is present if there are more than eight supported rates, and it is optional otherwise. |
| 5 | RM Enabled Capabilities (7) | RM Enabled Capabilities element is present if dot11RadioMeasurementActivated is true. |
| 6 | DSE registered location (22) | The DSE Registered Location element is present if dot11LCIDSERequired is true. |
| 7 | HT Capabilities (28) | The HT Capabilities element is present when dot11HighThroughputOptionImplemented attribute is true. |
| 8 | HT Operation (24) | The HT Operation element is included by an AP when dot11HighThroughputOptionImplemented attribute is ture. |
| 9 | 20/40 BSS Coexistance (3) | The 20/40 BSS Coexistence element is optionally present when the dot112040BSSCoexistenceManagementSupprot attribute is true. |
| 10 | Overlapping BSS Scan Parameters (16) | The Overlapping BSS Scan Parameters element is optionally present if the dot11FortyMHzOptionImplemented attribute is true. |
| 11 | Extended Capabilities (3) | The Extended Capabilities element is optionally present if any of the fields in this element are nonzero. |
| 12 | MAC Address (6) | |
| 13 | Status code (2) | |
| 14 | AID (2) | |
| 15 | RCPI (3) | The RCPI element is present if dot11RMRCPIMeasurementActivated is true. |
| 16 | RSNI (3) | The RSNI element is present if dot11RMRSNIMeasurementActivated is true. |
| 17 | Mobility domain (5) | An MDE is present in an Association Response frame when dot11FastBSSTransitionActivated is true and this frame is a response to an Association Request frame that contained an MED(i.e., an FT initial mobility domain association exchange). |
| 18 | Fast BSS transition (84-257) | A Fast BSS Transition element is present in an Association Response frame when dot11FastBSSTransitionActivated is ture, dot11RSNAActivated is true and this frame is response to an AssociationRequest frame that contained an MDE(i.e., an FT initial mobility domain association exchange in an RSN). |
| 19 | Timeout Interval(Association Comeback time) (7) | A Timeout Interval element containg the Association Comeback time is present when dot11RSNAActivated is true, dot11RSNAProtectedManagementFramesAcivated is true and the association request is rejected with a status code 30. |
| 20 | Vendor Specific (3-257) | One or more vendor-specific elements are optionally present. Theses elements follow all other elements. |

COMMUNICATION METHOD AND APPARATUS BASED ON ASSOCIATION MECHANISM IN WIRELESS LOCAL AREA NETWORK SYSTEM

CROSS-REFERENCE TO RELATED APPLICATIONS

This application is the National Stage filing under 35 U.S.C. 371 of International Application No. PCT/KR2012/001438, filed on Feb. 24, 2012, which claims the benefit of U.S. Provisional Application Ser. No. 61/504,327, filed on Jul. 5, 2011, and 61/506,169, filed on Jul. 11, 2011, the contents of which are all hereby incorporated by reference herein in their entirety.

TECHNICAL FIELD

The present invention relates to a Wireless Local Area Network (WLAN) system and, more particularly, to a communication method based on an association mechanism between stations in a WLAN system and an apparatus for supporting the same.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

As the WLAN is actively propagated and applications employing the WLAN are diversified, a necessity for a new WLAN system for supporting the throughput higher than the data processing speed supported by the IEEE 802.11n standard is on the rise in an STA. The next-generation WLAN system supporting a Very High Throughput (VHT) is the next version of an IEEE 802.11n WLAN system and is one of IEEE 802.11 WLAN systems which have recently been proposed in order to support a data processing speed of 1 Gbps or higher in an MAC Service Access Point (SAP).

The next-generation WLAN system supports the transmission of a Multiple User-Multiple Input Multiple Output (MU-MIMO) scheme in which a plurality of non-AP STAs accesses a radio channel at the same time in order to efficiently use the radio channel. According to the MU-MIMO transmission scheme, an AP can transmit a frame to one or more MIMO-paired non-AP STAs at the same time.

Meanwhile, as the propagation of the WLAN is activated, an environment is appearing where one AP provides service to a large number of non-AP STAs. Furthermore, as mobile devices supporting the WLAN are increased, there is a need for a method of supporting increased mobility.

In order for an AP and a non-AP STA to exchange frames including data in the WLAN, an association procedure must be first performed. If the number of non-AP STAs to be associated with one AP is increased, a very long time is necessary for the association because data exchanged for the association is increased. Furthermore, since the time occupied by a channel for the association procedure is increased, other STAs may be restricted to accessing the channel for traffic processing. Consequently, a current WLAN environment in which an association between an AP and non-AP STAs is frequently generated may not be properly supported owing to increased mobility, and thus the throughput of the WLAN system based on the substantial exchange of data may be deteriorated. Accordingly, there is a need for a communication method in a WLAN system based on an association procedure which is suitable for a new WLAN system environment.

SUMMARY OF INVENTION

Technical Problem

It is an object of the present invention to provide a communication method based on an association mechanism in a WLAN system and an apparatus for supporting the same.

Solution to Problem

In an aspect, a method of communicating between an access point (AP) and a station (STA) in a Wireless Local Area Network (WLAN) system is provided. The method comprising: receiving, by an AP, an association request (AREQ) frame requesting an association, from a STA, the AREQ frame comprising a common association response (C-ARSP) indicator indicating whether the STA has been received common association information for the association between the STA and the AP; determining, by the AP, an association response (ARSP) type for the STA based on the C-ARSP indicator; and performing, by the AP, an association response for the ARSP type to the STA.

If the C-ARSP indicator indicates that the STA has received the common association information, the performing the association response may include transmitting a user-specific association response (U-ARSP) frame to the STA. The U-ARSP frame may include dedicated association information for the STA for the association between the STA and the AP.

If the C-ARSP indicator indicates that the STA has not received the common association information, the performing the association response may include transmitting the C-ARSP frame to the STA, the C-ARAP including the common association information and transmitting the U-ARSP frame to the STA.

The U-ARSP frame may further include a status code field indicating a result of the association requested by the STA.

The method may further include transmitting, by the AP, a first data frame to the STA or receiving, by the AP, a second data frame from the STA, if the status code bit field indicates that the association requested by the STA has been normally completed.

The method may further include receiving, by the AP, the AREQ frame from the STA again, if the status code bit field indicates that the association requested by the STA has failed.

The method may further include retransmitting, by the STA, the AREQ frame to the AP, if the association response is not received within a specific time after transmitting the AREQ frame to the AP.

The dedicated association information may include an Association ID (AID) allocated to the STA.

The C-ARSP indicator may be a beacon ID of which the STA has received a beacon frame.

The determining the ARSP type for the STA based on the C-ARSP indicator may include determining a time point at which the STA has received the beacon frame based on the beacon ID; and determining whether current common association information is updated in comparison with common association information at the time point.

If all or part of the current common association information is updated, the performing the association response may include transmitting a common association response (C-ARSP) frame to the STA, the C-ARSP frame including the all or the part of the current association information; and transmitting a user-specific association response (U-ARSP) frame to the STA, the U-ARSP frame including dedicated association information for the STA for the association between the STA and the AP.

If the current common association information is not updated, the performing the association response may include transmitting a user-specific association response (U-ARSP) frame to the STA, the U-ARSP frame including dedicated association information for the STA for the association between the STA and the AP.

In another aspect a wireless apparatus is provided. The apparatus includes a transceiver transmitting and receiving a radio signal and a processor operably coupled with the transceiver. The processor is configured for: receiving an association request (AREQ) frame requesting an association, from the STA, the AREQ frame comprising a common association response (C-ARSP) indicator indicating whether the STA has been received common association information for the association between the STA and the apparatus; determining an association response (ARSP) type for the STA based on the C-ARSP indicator; and performing an association response for the ARSP type to the STA.

In still another aspect, a method of communication in a Wireless Local Area Network (WLAN) system, by an access point (AP), is provided. The method includes: receiving a first association request (AREQ) frame from a first station (STA), the AREQ frame requesting an association; receiving a second AREQ frame from a second STA; and transmitting an ARSP frame to the first STA and the second STA. The ARSP frame includes common association information for an association between the AP and STAs including the first STA and the second STA; first dedicated association information for the association between the AP and the first STA; and second dedicated association information for the association between the AP and the second STA.

The transmitting the ARSP frame may is performed after a lapse of a response interval since a point of time at which the first AREQ frame or the second AREQ frame is first received.

When a third AREQ frame is received from a third STA within the response interval, the ARSP frame may further include third dedicated association information for an association between the AP and the third STA.

Each of the first dedicated association information and the second dedicated association information may include a status code indicating a result of the association with the corresponding STA and an AID allocated to the corresponding STA.

Advantageous Effects of Invention

Common association information in common provided to a plurality of STAs is broadcasted, and user-specific association information related to a specific STA is individually transmitted. In this case, the time taken for an AP to occupy a radio medium in order to perform an association with STAs can be reduced. The total amount of data forming information exchanged for the association can also be reduced. Consequently, the overall throughput of a WLAN system can be improved because the association between the AP and the STAs can be completed more rapidly and more access to a radio medium for the exchange of data can be guaranteed.

STAs requesting an association request an AP to selectively transmit association information that has not yet been obtained thereto. In this case, the AP can be prevented from redundantly transmitting the association information already obtained by an STA. Consequently, the overall throughput of a WLAN system can be improved because unnecessary access of an AP and STAs, performing an association procedure, to a radio medium can be reduced.

The communication method based on an association mechanism as in an embodiment of the present invention can provide improved service to an increased number of STAs through a fast association procedure in a current WLAN environment requiring further improved mobility.

BRIEF DESCRIPTION OF DRAWINGS

FIG. 2 is a diagram showing an example of an association request frame format;

FIG. 3 is a diagram showing an example of an association response frame format;

FIG. 5 is a diagram showing an example of a C-ARSP frame format according to an embodiment of the present invention;

FIG. 6 is a diagram showing an example of a U-ARSP frame format according to an embodiment of the present invention;

FIG. 9 is a diagram showing the format of an M-ARSP frame to which an embodiment of the present invention may be applied;

MODE FOR THE INVENTION

Figure 1:
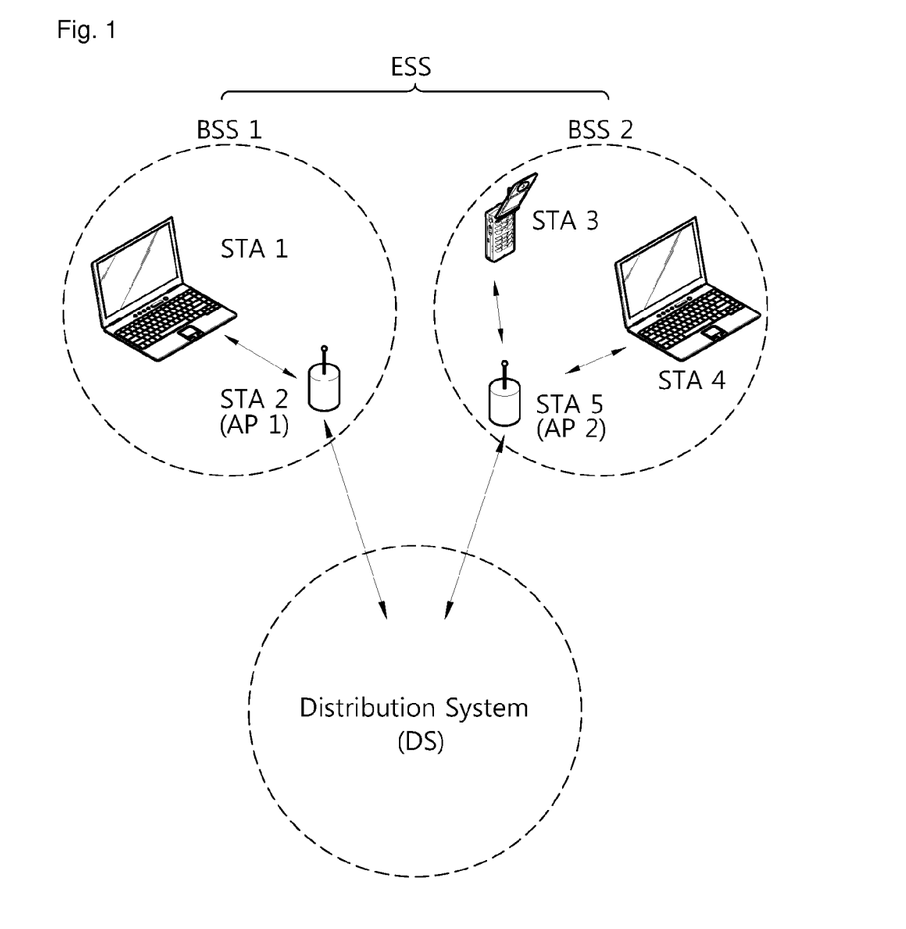
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA not an AP. The non-AP STA may also be referred to another terminology, such as a mobile terminal, a wireless device, a Wireless Transmit/Receive Unit (WTRU), User Equipment (UE), a Mobile Station (MS), a mobile subscriber unit, or simply a user. It is hereinafter assumed that the non-AP STA is an STA, for convenience of description.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 may be interconnected through a Distribution System (DS). The plurality of BSSs interconnected through the DS is called an Extended Service Set (ESS). An AP or STAs or both included in the ESS can communicate with each other. In the same ESS, an STA may move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

An STA performs a scanning procedure in order to find an accessible AP. A WLAN system supports an active scanning scheme and a passive scanning scheme which are performed by an STA. According to the active scanning scheme, an STA broadcasts a probe request frame. An AP that has received the probe request frame transmits a probe response frame to the relevant STA. The probe response frame includes operation parameters (e.g., the capability information element, the High Throughput (HT) operation element, and the EDCA parameter set element of the AP) related to a BSS configured by the AP. According to the passive scanning scheme, an STA obtains information about the operating information of an AP, being operated in a relevant channel, by receiving a beacon frame periodically transmitted by the AP. The active scanning scheme is advantageous in that the scanning procedure can be performed with low delay and low power consumption, as compared with the passive scanning scheme.

In order to transmit data through the exchange of data frames with an AP, an STA must be associated with the AP. The DS informs that the STA should be accessed through what AP. This process is called an association procedure. In general, the association procedure is started when an STA requests an association from an AP.

An STA initiates an association procedure by sending an association request (AREQ) frame (i.e., a management frame) to an AP. In response thereto, the AP sends an association response (ARSP) frame (i.e., a management frame) to the STA.

The association request frame provides pieces of information, such as STA capability and a Service Set ID (SSID). The association response frame provides information, such as AP capability, and includes information about an Association ID (AID) to be allocated to a requesting STA.

FIG. 2 is a diagram showing an example of the association request frame format, and FIG. 3 is a diagram showing an example of the association response frame format.

As wireless equipment supporting the WLAN is widely propagated, a situation where a plurality of STAs is associated with an AP at the same time may occur. A plurality of STAs may perform handover to a new AP or attempt an initial link setup with a new AP. For example, in the mass transit, when a plurality of users moves, the users are associated with an AP installed in a means of transportation, but may attempt to associate with an AP installed in their destination after arriving the destination.

In the above association procedure, when a plurality of STAs attempts an association with one AP as described above, the AP must individually respond to the requesting STAs. For this, each STA transmits an association request frame having a format, such as that shown in FIG. 1, to the AP, and the AP transmits an association response frame having a format, such as that shown in FIG. 2, to each STA. Here, the association response frame includes not only user-specific association information about each STA, such as an AID, but also common association information independent from the STAs, such as the capability of the AP. The common association information occupies a large percentage of the total information included in the association response frame. Accordingly, if an AP individually responds to a plurality of requesting STAs, the common association information is redundantly transferred as many as the number of requesting STAs. Consequently, the time taken for the AP to transfer the common association information to the STAs occupies most of the time taken for all the STAs to complete an association. It results in a phenomenon where a radio medium is unnecessarily accessed in order to redundantly transmit the same information, thereby deteriorating the efficiency of a WLAN system.

In order to overcome the problem of the WLAN communication method based on the existing association mechanism, there is proposed a communication method based on a new association mechanism.

There is proposed a method of an AP dividing frames into a frame including user-specific association information, from among pieces of information transmitted according to an association response, and a frame including common association information, from among the pieces of information, and processing the frames, when performing an association procedure. It is assumed that an association response including the user-specific association information is a User-specific Association Response (U-ARSP) and an association response including the common association information is a Common Association Response (C-ARSP).

STAs performs authentication before requesting an association, and STAs that have not successfully completed the authentication cannot transmit AREQ frames to an AP. All STAs can receive a C-ARSP frame broadcasted by an AP, and an STA that has not completed authentication can also receive the C-ARSP frame. After receiving the C-ARSP frame, STAs complete the authentication process. After the authentication process is successfully completed, the STAs can be associated with the AP by requesting the association from the AP and receiving a U-ARSP frame in response thereto. The request of the association from the AP by an STA that has completed the authentication process may be started when the relevant STA obtains a channel access right by performing a contention with other STAs in order to access the channel. Here, other STAs include not only STAs requesting the association, but also all STAs sharing the wireless medium at the same point of time.

Figure 4:
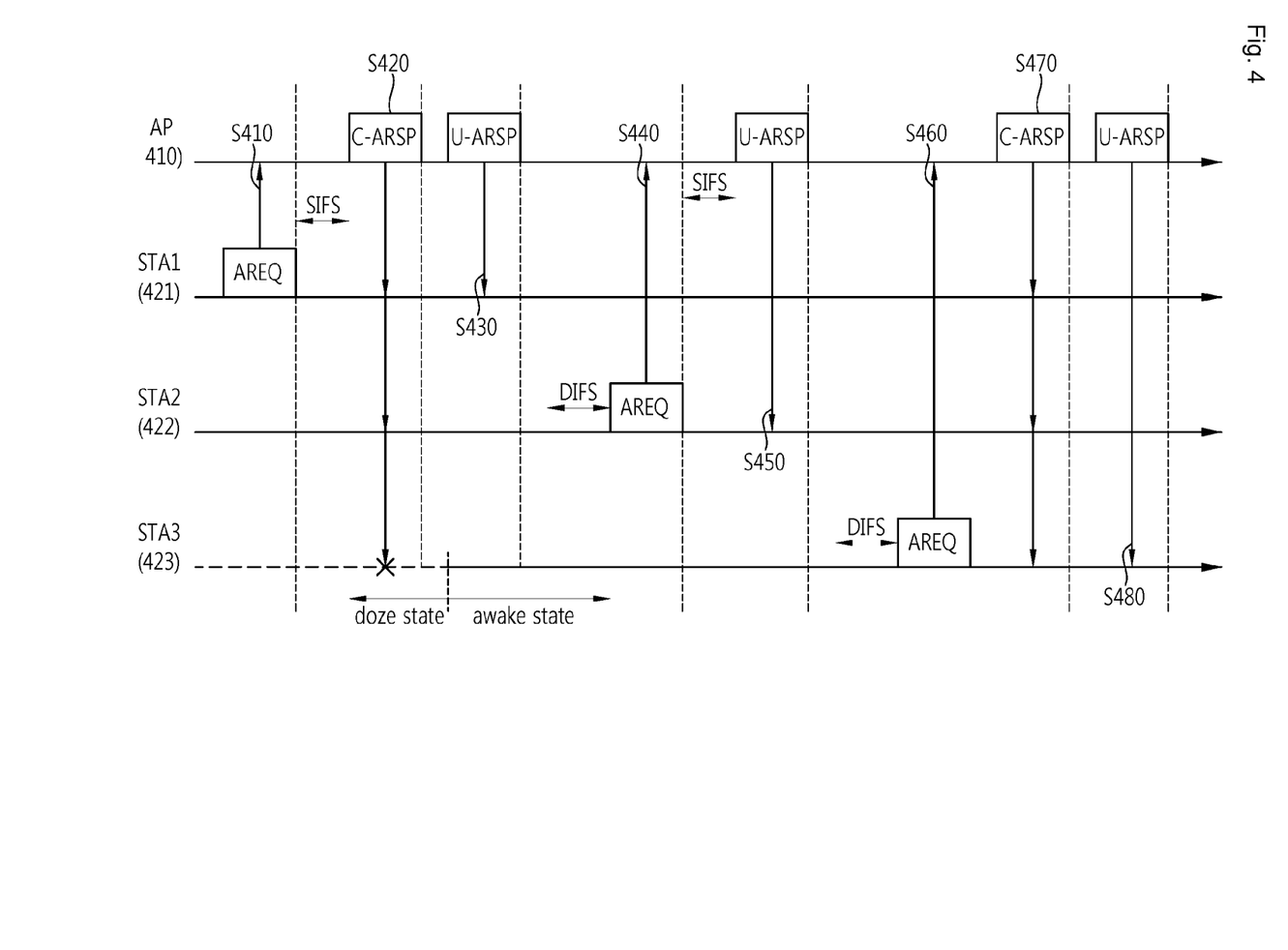
FIG. 4 is a flowchart illustrating a communication method based on an association mechanism according to an embodiment of the present invention.

FIG. 4 is a flowchart illustrating a communication method based on an association mechanism according to an embodiment of the present invention.

Referring to FIG. 4, three STAs 421, 422, and 423 exist in the coverage of an AP 410, and each of the STAs attempts an association with the AP 410. The number of STAs shown in FIG. 4 is only illustrative, and the number of STAs attempting the association is not limited. Furthermore, the STAs are illustrated to sequentially request the association with the AP, but the order that the STAs request the association is not limited. A collision may be generated because the STAs transmit respective association request (AREQ) frames or other STAs transmit data frames through radio channel access or both.

The STA1 421 transmits the AREQ frame to the AP 410 at step S410. The AREQ frame transmitted by the STA1 421 has the same frame format as above. However, information indicating whether the STA1 421 has already received common association information by receiving a C-ARSP frame transmitted by the AP 410 needs to be further included in the AREQ frame. To this end, the AREQ frame may further include a bit field called a C-ARSP indicator. For example, if the C-ARSP indicator field is 0, it may indicate that an STA that has transmitted the AREQ frame has never received the C-ARSP frame. If the C-ARSP indicator field is 1, it may indicate that an STA that has transmitted the AREQ frame has ever received the C-ARSP frame. The setting of the field value is only illustrative. In the present embodiment, the C-ARSP indicator may be set to 0 because the AP 410 has never transmitted the C-ARSP frame.

When the AREQ frame transmitted by the STA1 421 is received, the AP 410 determines whether to transmit a C-ARSP frame or a U-ARSP frame based on a C-ARSP indicator included in the AREQ frame. Since the C-ARSP indicator set to 0 is included in the AREQ frame transmitted by the STA1 421, the AP 410 transmits the C-ARSP frame to the STAs at step S420. The C-ARSP frame is broadcasted. The C-ARSP frame, as described above, includes common association information transmitted to STAs through an ARSP. For the format of the C-ARSP frame, reference may be made to FIG. 5.

FIG. 5 is a diagram showing an example of the C-ARSP frame format according to an embodiment of the present invention. Referring to FIG. 5, the C-ARSP frame includes fields related to common association information, from among the field included in the ARSP frame of FIG. 3.

Referring back to FIG. 4, after transmitting the C-ARSP frame, the AP 410 transmits a U-ARSP frame to the STA1 421 at step S430. The AP 410 transmits the C-ARSP frame and, after a Point Coordination Function (PCF) Interframe Space (PIFS), may immediately transmit the U-ARSP frame to the STA1 421 without a contention process for accessing a radio medium. The U-ARSP frame is unicasted to the STA1 421 because it includes user-specific association information. For the format of the U-ARSP frame, reference may be made to FIG. 6.

FIG. 6 is a diagram showing an example of the U-ARSP frame format according to an embodiment of the present invention.

Referring to FIG. 6, the U-ARSP frame includes fields related to specific association information about a specific STA, from among the fields included in the ARSP frame of FIG. 3. The U-ARSP frame further includes information indicating whether the association of an STA requesting the association has been successfully completed. To this end, a status code bit field is further included in the U-ARSP frame.

The STA1 421 may determine a result of the association with the AP 410 based on the status code bit field received from the AP 410. If the status code bit field indicates that the association has been successfully completed, the STA1 421 that has received the U-ARSP frame may start a next procedure, such as Robust Security Network Association (RSNA) establishment. If the status code bit field of the U-ARSP frame indicates that the association has failed, the STA1 421 may know that the association has not been normally completed.

The STA2 422 transmits an AREQ frame to the AP 410 at step S440. The STA2 422 has already obtained the common association information through the C-ARSP frame corresponding to the AREQ frame of the STA1 421. Thus, the AREQ frame transmitted by the STA2 422 includes a C-ARSP indicator field set to 1.

The AP 410 transmits a U-ARSP frame to the STA2 422 in response to the AREQ frame of the STA2 422 at step S450. The U-ARSP frame includes association information specific to the STA2 422.

The STA3 423 transmits an AREQ frame to the AP 410 at step S460. Here, the STA3 423 may not transmit the AREQ frame right after the association of the STA2 422 is finished, but may transmit the AREQ frame after obtaining a radio medium access right after a lapse of specific time. The STA3 423 has not received the C-ARSP frame because it is operated in a doze state when the AP 410 transmits the C-ARSP frame (S420). Accordingly, the AREQ frame transmitted by the STA3 423 may include a C-ARSP indicator field set to 0.

The AP 410 transmits a C-ARSP frame to the STA3 423 in response to the AREQ frame of the STA3 423 at step S470 and transmits a U-ARSP frame to the STA3 423 at step S480. The U-ARSP frame transmitted by the AP 410 includes association information specific to the STA3 423.

The STA1 421, the STA2 422, and the STA3 423 associated with the AP 410 may perform communication, such as the exchange of data frames with the AP 410 through capability information of the received association information. The STA1 421 and the STA2 422 may first perform an operation of exchanging frames with the AP 410, if the STA3 423 accesses the radio medium before completing the association with the AP 410.

Meanwhile, if a U-ARSP frame is not received from an AP within a time interval indicated by an AssociationFailureTimeout value, STAs may determine that an association with the AP has failed. The AssociationFailureTimeout is a value previously set to an STA, and it refers to a maximum time interval in which a response from an AP must be received after an AREQ frame is transmitted. If the association is determined to be failed as described above, an STA may transmit an AREQ frame to an AP in order to request an association again. When transmitting the AREQ frame again, the STA may immediately transmit the AREQ frame without a contention process or may transmit the AREQ frame after obtaining a radio medium access right through a contention process. Here, a C-ARSP indicator included in the AREQ frame may indicate that a C-ARSP frame has already been received. In addition, if a status code bit field is not related to a STA configuration regarding a reason indicating a successful association, the STA transmits the AREQ frame to the AP through a contention process.

There may be proposed a communication method based on an association mechanism through a C-ARSP frame and a U-ARSP frame without utilizing the C-ARSP indicator field, indicating whether the C-ARSP frame has been transmitted, in AREQ frames transmitted by STAs as in the embodiment of FIG. 4. When AREQ frames are received from STAs, an AP transmits a U-ARSP frame to a specific STA irrespective of whether the specific STA has received a C-ARSP frame. That is, a requesting STA may have or may not have common association information after receiving a C-ARSP frame. An AP may periodically transit a C-ARSP frame irrespective of the state of a requesting STA. This is described in detail with reference to FIG. 7.

Figure 7:
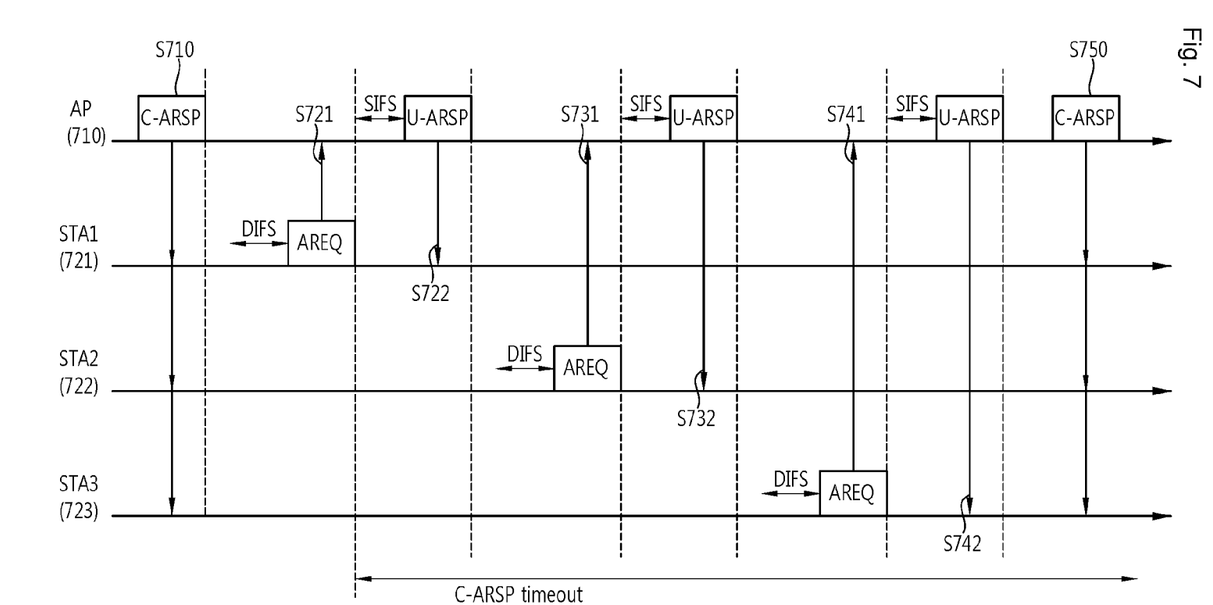
FIG. 7 is a flowchart illustrating a communication method based on an association mechanism according to an embodiment of the present invention.

FIG. 7 is a flowchart illustrating a communication method based on an association mechanism according to an embodiment of the present invention.

Referring to FIG. 7, an AP 710 transmits a C-ARSP frame at step S710. The C-ARSP frame may have a format, such as that shown in FIG. 5 from which a C-ARSP indicator field has been excluded. Unlike in the embodiment of FIG. 4, the AP 710 may periodically transmit the C-ARSP frame without transmitting the C-ARSP frame at the request of an STA.

An STA1 721, an STA2 722, and an STA3 723 transmit respective AREQ frames to the AP 710 at steps S721, S731, and S741. The AP 710 transmits respective U-ARSP frames to the STAs in response to the respective AREQ frames transmitted by the STAs at steps S722, S732, and S742. If an STA that has received a U-ARSP frame has already received a C-ARSP frame and a status code bit field included in the U-ARSP frame indicates that an association is successful, the STA completes the association procedure and proceeds to a next procedure. However, an STA that has not received a C-ARSP frame waits until the C-ARSP frame is received, although a U-ARSP frame including a status code bit field indicating that an association is successful is received. After receiving the C-ARSP frame, the STA proceeds to a next procedure.

In a WLAN system based on an association mechanism, such as that shown in FIG. 7, a maximum standby time in which each STA receives a C-ARSP frame needs to be separately set, in addition to the AssociationFailureTimeout value related to the reception of the U-ARSP frame. This is called a C-ARSP timeout. The AP 710 broadcasts a C-ARSP frame before a C-ARSP timeout elapses since a point of time at which an AREQ frame was first received from any STA, after transmitting the C-ARSP frame most recently at step S750.

Meanwhile, the AP 710 may not transmit the C-ARSP frame at an appropriate point of time, such as that access to a radio medium for transmitting the C-ARSP frame is failed. In this case, STAs transmit AREQ frames to the AP 710, but may do not receive a C-ARSP frame from the AP 710 within a C-ARSP timeout interval. An STA may request an association with the AP 710 by transmitting the AREQ frame to the AP 710 because the association with the AP has failed.

For example, unlike in the drawing of FIG. 7, the AP 710 may receive the AREQ frames from the STA2 722 and the STA3 723 from a point of time at which the AP 710 received the AREQ frame from the STA1 721 to a point of time at which the AP 710 transmits the C-ARSP frame. Here, the point of time at which the AP 710 transmits the C-ARSP frame may exceed a C-ARSP timeout for the AREQ frame of the STA1 721. However, the point of time at which the AP 710 transmits the C-ARSP frame may not exceed a C-ARSP timeout for the AREQ frame of the STA2 722 or the AREQ frame of the STA3 723 or both. In this case, the STA1 721 does not receive the C-ARSP frame and fails in the association, but the STA2 722 and the STA3 723 may successfully complete the association by receiving the C-ARSP frame.

If an STA has obtained all pieces of information necessary to perform a next procedure although it has not received a C-ARSP frame, the STA may be set to perform the next procedure without receiving the C-ARSP frame.

Through an association procedure, such as that shown in FIG. 7, the STAs 721, 722, and 723 associated with the AP 710 may perform WLAN communication, such as the exchange of frames with the AP 710.

Meanwhile, in the association procedure, an AP may send one ARSP frame in response to a plurality of AREQ frames transmitted by STAs. To this end, the AP may transmit an M-ARSP frame to the STAs. This is described in detail with reference to FIG. 8.

Figure 8:
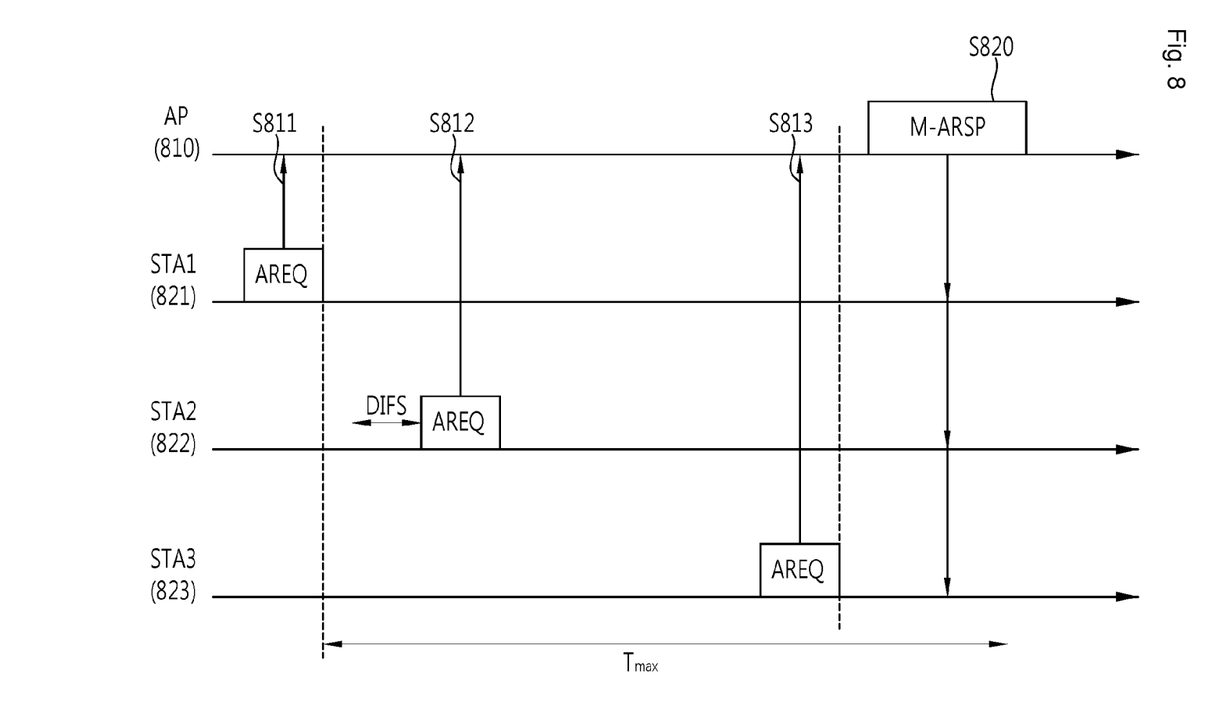
FIG. 8 is a diagram showing another example of the association mechanism according to an embodiment of the present invention.

FIG. 8 is a diagram showing another example of the association mechanism according to an embodiment of the present invention.

Referring to FIG. 8, an AP 810 receives AREQ frames, requesting an association, from an STA1 821, an STA2 822, and an STA3 823 at steps S811, S812, and S813. The AREQ frame may have the same format as the above AREQ frame.

In response thereto, the AP 810 transmits an M-ARSP frame to the STA1 821, the STA2 822, and the STA3 823 at step S820.

The M-ARSP frame includes a common association information element in common transmitted in response to the AREQ frames received from the STAs, the MAC address of each STA, and an STA-specific association information element corresponding to the MAC address. The M-ARSP frame is broadcasted by the AP. For the format of the M-ARSP frame, reference may be made to FIG. 9.

FIG. 9 is a diagram showing the format of the M-ARSP frame to which an embodiment of the present invention may be applied.

Referring to FIG. 9, information elements related to an order 1 to an order 11 are related to common association information-related elements for the STAs 821, 822, and 823 which request the association with the AP 810.

9 information elements related to an order 12 to an order 20 are related to a STA-specific information element set for a specific STA. The STA-specific information element set related to the specific STA includes information about dedicated association information for each of the STAs which have transmitted the AREQ frames to the AP 810.

The STA-specific information element set may be further included according to the number of STAs which have transmitted the AREQ frames to the AP 810. If n STAs transmit AREQ frames to an AP, an M-ARSP frame may include n STA-specific information element sets. In the example of FIG. 8, three STA-specific information element sets may be included.

The STA-specific information element set inevitably includes information elements for an MAC address, a status code, and an AID, but may include or may not include information elements for an RCPI RSNI, a mobility domain, a fast BSS transition, a timeout interval, and vendor Specific. Accordingly, the STA-specific information element set related to each STA may further include a maximum of 6 additional information elements in addition to three fields for the MAC address, the status code, and the AID.

The information elements related to the order 12 to the order 20 may be repeated, but STAs receiving an M-ARSP frame may distinguish the information elements because each of the information elements has an information element ID. Accordingly, an STA may obtain information by interpreting only its relevant information elements before a next MAC address after its own MAC address.

Referring back to FIG. 8, after transmitting the AREQ frames to the AP 810, the STAs 821, 822, and 823 wait for the transmission of the M-ARSP frame during a specific interval $T_{max}$. The AP 810 waits during the $T_{max}$ interval (i.e., the predetermined timeout interval of the M-ARSP frame) from a point of time at which the AREQ frame is foremost received from the STA1 821. During the $T_{max}$ interval, the AP 810 does not individually respond to the AREQ frames transmitted by the STA2 822 and the STA3 823. Next, the AP 810 broadcasts the M-ARSP frame within the $T_{max}$ interval at step S820.

If the $T_{max}$ interval elapses without receiving the M-ARSP frame during the $T_{max}$ interval, each STA transmits the AREQ frame to the AP 810 again (not shown).

In addition, the STAs may request the AP 810 to transmit specific association information thereto. To this end, the AREQ frame may include an STA information element related to information indicating a specific information element. The AP 810 may determine association information necessary for each STA by receiving the STA information element.

Figure 10:
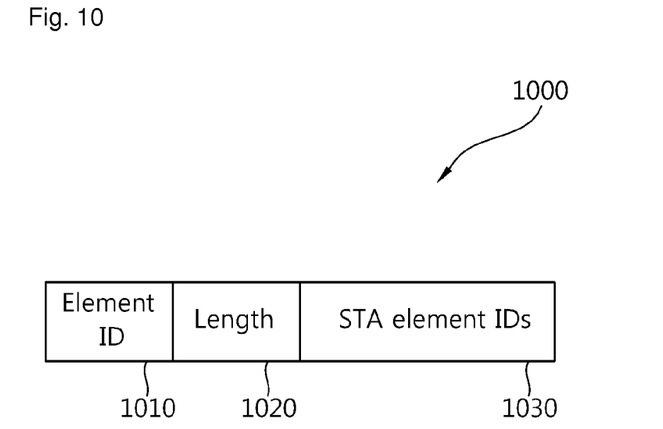
FIG. 10 is a block diagram showing the format of an STA information element according to an embodiment of the present invention.

FIG. 10 is a block diagram showing the format of the STA information element according to an embodiment of the present invention.

Referring to FIG. 10, the STA information element 1000 includes an element ID field 1010, a length field 1020, and an STA element ID field 1030. The element ID field 1010 indicates that a relevant information element is an STA information element. The length field 1020 indicates the length of the STA information element 1000.

The STA element ID field 1030 indicates an association information element that has been received or not received by an STA from an AP. This may be implemented so that an ID of a specific association information element is included in the STA element ID field 1030.

If an AP is informed of an association information element already received, the STA element ID field 1030 may include element ID values for an information element not obtained by an STA. In this case, the AP may transmit a U-ARSP frame including only association information elements which are not related to element IDs included in the STA element ID field 1030.

If an AP is informed of an association information element not yet received, the STA element ID field 1030 may include element ID values for an information element already received by an STA. In this case, the AP may transmit a U-ARSP frame including only association information elements for an element ID included in the STA element ID field 1030.

Meanwhile, an STA may receive a beacon frame or a probe response frame or both from an AP, before transmitting an AREQ frame. The beacon frame or the probe response frame or both may include the association information elements included in the above C-ARSP frame. Accordingly, an STA which has obtained information elements included in the C-ARSP frame by already receiving the beacon frame or the probe response frame or both includes information indicating the already obtained elements in the AREQ frame and transmits the AREQ frame. Here, the already obtained elements may include not only the elements included in the C-ARSP frame, but also part of or all the association information elements included in the ARSP frame.

If a protocol in which information elements not yet received are included in the AREQ frame and then transmitted to an AP is used, an STA may include information, indicating the remaining elements other than the elements included in the beacon frame or the probe response frame or both, in the AREQ frame and then transmits the AREQ frame.

An AP that has received the above AREQ frame transmits a U-ARSP frame to the STA. The U-ARSP frame includes information elements necessary for the STA. The information elements included in the U-ARSP frame may differ according to a target transmission STA. The U-ARSP frame may be transmitted without a contention process after a lapse of a PIFS or an SIFS since the AREQ frame was received. The STA that has transmitted the AREQ frame must receive the U-ARSP frame from the AP before an AssociationFailureTimeout interval. If the U-ARSP frame is not received from the AP, the STA transmits the AREQ frame to the AP again.

Meanwhile, as described above, the beacon frame or the probe response frame or both may include the common association information elements shown in FIG. 5. Accordingly, STAs that have received the beacon frame or the probe response frame before an association request receive the same information elements as the common association information elements through the beacon frame or the probe response frame. In this case, if the STAs have only to inform an AP that they have once received the beacon frame, the AP can know that the STAs have already received the common association information elements through the beacon frame. That is, when the AP receives an AREQ frame including an indicator, indicting that the STAs have normally received the beacon frame, from the STAs, the AP may transmit a U-AREQ frame, including STA-specific association information elements, to each of the STAs.

The beacon frame may be periodically transmitted by an AP. If capabilities for a BSS configured by the AP are changed, the values of one or more information elements included in the beacon frame may be changed. Accordingly, one or more association information elements included in the beacon frame may be changed according to a point of time at which the beacon frame is transmitted. In this case, if an STA includes an indicator, indicating whether the beacon frame has been received, in an AREQ frame and transmits the AREQ frame, the AP transmits a U-ARSP frame including STA-specific information elements for the relevant STA irrespective of the changed association information elements. It may make different a specific element of the AP from a specific element obtained by an STA.

In order to prevent this problem, an information element called a beacon ID element may be further included in the beacon frame. The beacon ID element includes an element ID field, a length field, and a beacon ID field. The element ID field indicates that a relevant element is a beacon ID information element. The length field indicates the length of the beacon ID field. The beacon ID field may have a 1 octet length.

The beacon ID field may be set so that the value thereof is increased by 1 whenever one or more of information elements included in the beacon frame are changed. The beacon ID value may be between a minimum value 0 and a maximum value $2^8-1$ and may be reset if an information element is changed. The maximum value or a range of the value may be changed according to the length of the beacon ID field. An AP may indicate whether the information elements included in the beacon frame have been updated through the beacon ID value, when transmitting the beacon frame. In an embodiment of the present invention, however, the beacon ID value may be set to be updated when the value of the association information element is changed.

The beacon ID element may also be included in the AREQ frame transmitted to an STA to an AP. The beacon ID element included in the AREQ frame may be set so that the beacon ID element includes the beacon ID value of a beacon frame that has been most recently received by the STA.

When the beacon frame is received from the AP, the STA sets the beacon ID value of the AREQ frame as the beacon ID value included in the beacon frame and transmits the AREQ frame to the AP that has transmitted the beacon frame. An STA that has not received a beacon frame from an AP with which the STA tries to be associated does not include the beacon ID element in the AREQ frame.

When the AREQ frame is received from the STA, the AP checks the beacon ID value of the AREQ frame. If the beacon ID element is not included in the AREQ frame, the AP may transmit the ARSP frame, including all the association information elements, to the STA.

If the beacon ID element is included in the AREQ frame, the AP may determine that the STA has received common association information elements. Furthermore, if a beacon ID included in the AREQ frame is identical with the beacon ID of a beacon frame that has been most recently transmitted by the AP, the AP may determine that an STA has normal common association information elements. Accordingly, the AP may transmit a U-ARSP frame to the STA.

A beacon ID included in an AREQ frame may differ from the beacon ID of a beacon frame that has been most recently transmitted by an AP. It means that an STA received only a previous beacon frame from the AP, but has not received a beacon frame after information elements are changed. An AP compares the information elements of a beacon frame, indicated by the beacon ID of an AREQ frame, with information elements currently set by the AP. If some of or all of the information elements of common association information elements differ, the AP may include relevant common association information element(s) in a U-ARSP frame and transmits the U-ARSP frame to the STA.

If an AP does not store elements related to the beacon ID of a beacon frame previously transmitted or it is difficult for the AP to track previous elements, the AP may transmit an ARSP frame, including all the association information elements, to an STA only when the beacon ID of the AREQ frame is not identical with the beacon ID of the AP.

In order to supplement a change of information elements included in a beacon frame or a probe response frame or both, a timestamp may be proposed instead of proposing the beacon ID as described above. To this end, an AREQ frame, transmitted from an STA to an AP in order to request an association, may further include a validity element.

The validity element includes an element ID field, a length field, and a validity field. The element ID field indicates that a relevant information element is the validity element. The length field indicates the length of the validity field. The size of the length field may be set to 1 octet. The length field may be set to indicate 3 octets in the size of the validity field, but it is only illustrative.

The validity field includes information about a timestamp broadcasted by an AP. More particularly, the validity field consists of 24 LSBs of the 64-bit timestamp sequence of a beacon frame or a probe response frame which is transmitted by the AP. The value of the validity field may be updated when an STA receives another beacon frame or another probe response frame from an AP.

When common association information elements in the capabilities of a BSS based on an AP are updated, the AP updates a Time Synchronization Function (TSF) time for a relevant point of time and keeps track of the TSF time.

The AP determines whether common association information elements obtained by an STA have been most recently updated through a validity field included in an AREQ frame received from the STA. More particularly, the AP checks whether the validity field of the AREQ frame is smaller than 3 octets of a TSF time corresponding to a point of time at which the common association information elements managed by the AP have been updated most recently.

If the value of the validity field is equal to or greater than the most recently updated TSF time, the AP determines that the STA has the most recent common association information elements. In this case, the AP transmits a U-ARSP frame (i.e., an ARSP frame not including the common association information elements) to the STA.

If the value of the validity field is smaller than the most recently updated TSF time, the AP determines that the STA has expired common association information elements. In this case, the AP transmits an ARSP frame, including all the common association information elements, to the STA. As described above, in the association mechanism based on the timestamp information, such as the validity field, an AP determines whether the elements of an STA are up-to-date and selectively transmits an ARSP frame according to a result of the determination. Accordingly, the time taken for an association and the time that a medium is occupied can be reduced, and the overall throughput of a WLAN system can be reduced.

The method of performing an association through the beacon ID or the timestamp information as described above may be selectively applied to various examples of the association procedure according to the embodiments of the present invention. Accordingly, an AP may selectively transmit association information elements to an STA.

Figure 11:
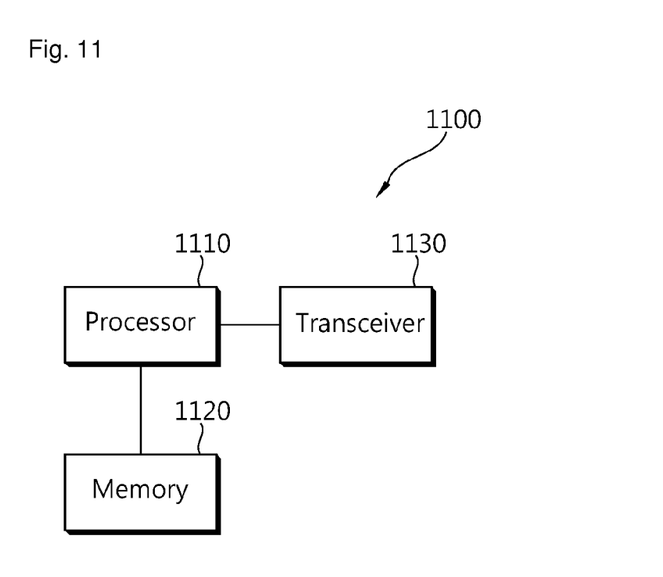
FIG. 11 is a block diagram showing a wireless apparatus in which the embodiments of the present invention may be implemented.

FIG. 11 is a block diagram showing a wireless apparatus in which the embodiments of the present invention may be implemented.

Referring to FIG. 11, the wireless apparatus 1100 includes a processor 1110, memory 1120, and a transceiver 1130. The transceiver 1130 transmits a radio signal or receives a radio signal or both and implements the physical layer of IEEE 802.11. The processor 1110 is functionally coupled to the transceiver 1130 and is configured to generate, transmit, and receive the AREQ frame for an association request. The processor 1110 may generate, transmit, and receive the C-ARSP frame, the U-ARSP frame, and the M-ARSP frame for an association response. The processor 1110 may generate, transmit, and receive a data frame. The processor 1110 is set to implement the MAC layer or the PHY layer or both which implement the embodiments of the present invention shown in FIGS. 2 to 10.

The processor 1110 or the transceiver 1130 or both may include Application-Specific Integrated Circuits (ASICs), other chipsets, logic circuits, and/or data processors. When the above embodiment is implemented in software, the above scheme may be implemented using a module (process or function) for performing the above function. The module may be stored in the memory 1120 and executed by the processor 1110. The memory 1120 may be placed inside the processor 1110 or may be placed outside the processor 1110 and functionally coupled to the processor 1110 by a variety of well-known means.

The invention claimed is:

1. A method of communicating between an access point (AP) and a station (STA) in a Wireless Local Area Network (WLAN) system, the method comprising:
   receiving, by an AP, an association request (AREQ) frame requesting an association, from a STA, the AREQ frame comprising a common association response (C-ARSP) indicator related to common association information for the association between the STA and the AP;
   determining, by the AP, an association response (ARSP) type for the STA based on the C-ARSP indicator; and
   performing, by the AP, an association response based on the ARSP type to the STA.

2. The method of claim 1, wherein if the C-ARSP indicator indicates that the STA has received the common association information, the performing the association response includes transmitting a user-specific association response (U-ARSP) frame to the STA, the U-ARSP frame including dedicated association information for the STA for the association between the STA and the AP.

3. The method of claim 2, wherein if the C-ARSP indicator indicates that the STA has not received the common association information, the performing the association response includes transmitting the C-ARSP frame to the STA, the C-ARSP frame including the common association information, and, transmitting the U-ARSP frame to the STA.

4. The method of claim 3, wherein the U-ARSP frame further includes a status code field indicating a result of the association requested by the STA.

5. The method of claim 4, further comprising transmitting, by the AP, a first data frame to the STA or receiving, by the AP, a second data frame from the STA, if the status code bit field indicates that the association requested by the STA has been normally completed.

6. The method of claim 5, further comprising receiving, by the AP, the AREQ frame from the STA again, if the status code bit field indicates that the association requested by the STA has failed.

7. The method of claim 5, further comprising retransmitting, by the STA, the AREQ frame to the AP, if the association response is not received within a specific time after transmitting the AREQ frame to the AP.

8. The method of claim 4, wherein the dedicated association information includes an Association ID (AID) allocated to the STA.

9. The method of claim 1, wherein the C-ARSP indicator is a beacon ID of which the STA has received a beacon frame.

10. The method of claim 9, wherein the determining the ARSP type for the STA based on the C-ARSP indicator includes:
    determining a time point at which the STA has received the beacon frame based on the beacon ID; and
    determining whether current common association information is updated in comparison with common association information at the time point.

11. The method of claim 10, if all or part of the current common association information is updated, the performing the association response includes:
    transmitting a common association response (C-ARSP) frame to the STA, the C-ARSP frame including the all or the part of the current association information; and
    transmitting a user-specific association response (U-ARSP) frame to the STA, the U-ARSP frame including dedicated association information for the STA for the association between the STA and the AP.

12. The method of claim 11, if the current common association information is not updated, the performing the association response includes transmitting a user-specific association response (U-ARSP) frame to the STA, the U-ARSP frame including dedicated association information for the STA for the association between the STA and the AP.

13. A wireless apparatus, comprising:
    a transceiver transmitting and receiving a radio signal; and
    a processor operably coupled with the transceiver,
    wherein the processor is configured for:
       receiving an association request (AREQ) frame requesting an association, from the STA, the AREQ frame comprising a common association response (C-ARSP) indicator indicating whether the STA has been received common association information for the association between the STA and the apparatus;
       determining an association response (ARSP) type for the STA based on the C-ARSP indicator; and
       performing an association response based on the ARSP type to the STA.

14. A method of communication in a Wireless Local Area Network (WLAN) system, by an access point (AP), the method comprising:
    receiving a first association request (AREQ) frame from a first station (STA), the AREQ frame requesting an association;
    receiving a second AREQ frame from a second STA; and
    transmitting an association response (ARSP) frame to the first STA and the second STA, wherein the ARSP frame comprises:
    common association information for an association between the AP and STAs including the first STA and the second STA;
    first dedicated association information for the association between the AP and the first STA; and
    second dedicated association information for the association between the AP and the second STA.

15. The communication method of claim 14, wherein the transmitting the ARSP frame is performed after a lapse of a response interval since a point of time at which the first AREQ frame or the second AREQ frame is first received.

16. The communication method of claim 15, wherein when a third AREQ frame is received from a third STA within the response interval, the ARSP frame further comprises third dedicated association information for an association between the AP and the third STA.

17. The communication method of claim 16, wherein each of the first dedicated association information and the second dedicated association information comprises a status code indicating a result of the association with the corresponding STA and an AID allocated to the corresponding STA.

18. The method of claim 14,
wherein the common association information includes information for an association procedure which is independent to the first STA and the second STA,
wherein the first dedicated association information includes information for the association procedure which is dependent to the first STAs performing the association procedure,
wherein the second dedicated association information includes information for the association procedure which is dependent to the second STAs performing the association procedure.

19. The method of claim 3,
wherein the common association information includes information for an association procedure which is independent to STAs performing the association procedure,
wherein the dedicated association information includes information for the association procedure which is dependent to each of the STAs performing the association procedure.

20. The wireless apparatus of claim 13, wherein
if the C-ARSP indicator indicates that the STA has received the common association information,
the processor is further configured to transmit a user-specific association response (U-ARSP) frame to the STA for the association response, the U-ARSP frame including dedicated association information for the STA for the association between the STA and the AP.

21. The wireless apparatus of claim 20, wherein
if the C-ARSP indicator indicates that the STA has not received the common association information,
the processor is further configured to:
transmit the C-ARSP frame to the STA, the C-ARAP including the common association information for the association response, and
transmit the U-ARSP frame to the STA for the association response.

22. The wireless apparatus of claim 21,
wherein the common association information includes information for an association procedure which is independent to STAs performing the association procedure,
wherein the dedicated association information includes information for the association procedure which is dependent to each of the STAs performing the association procedure.

* * * * *